Figure 1:
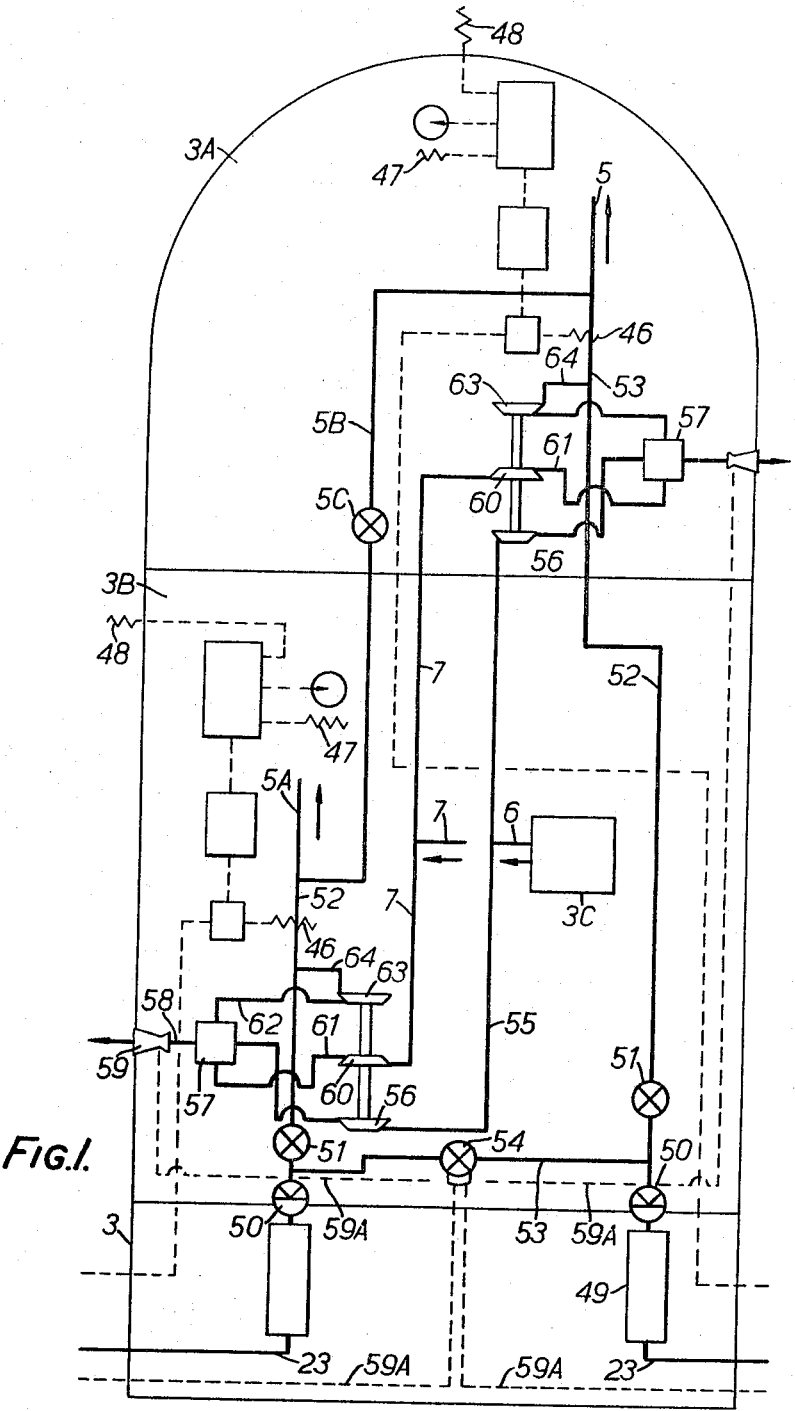

United States Patent Office 3,326,109
Patented June 20, 1967

3,326,109
AIR CONDITIONING SYSTEMS FOR AIRCRAFT
Basil Gervase Markham, Bitton, near Bristol, England, assignor to Bristol Siddeley Engines Limited, Bristol, England, a company of Great Britain
Filed Mar. 11, 1964, Ser. No. 353,649
14 Claims. (Cl. 98—1.5)

This invention relates to air conditioning systems for aircraft of the kind including means for delivering fresh air continuously from an air compressor (for example the compressor of a propulsion unit of the combustion turbine type) to one or more cabins (the word "cabin" here being used for convenience to identify any enclosed chamber or space or series of chambers or spaces) by way of heat extraction apparatus conveniently of the so-called "bootstrap" type, that is to say a free-running heat extraction apparatus comprising a compressor mechanically coupled to a turbine with which it is arranged in series with an interposed heat exchanger so that the air to be treated is compressed by the compressor, its temperature and pressure being thereby raised, the temperature is then reduced by the heat exchanger and the air is finally expanded in the turbine, sufficient energy being extracted from it to drive the compressor, so that its temperature and pressure are reduced below those of the input air.

The invention has for its object to provide an improved form of cabin air conditioning system of the kind referred to including so called "recirculation" means for continuously extracting air from the cabin, extracting heat from it and returning it to the cabin, in addition to means by which air is continuously discharged from the cabin to the atmosphere at a rate depending on that at which fresh air is continuously supplied to the cabin, and on required changes in cabin pressure.

According to one aspect of the invention, a cabin air conditioning system of the kind referred to includes means for withdrawing air from the cabin and returning part of the air so withdrawn to the cabin while exhausting the remaining part of such air to the atmosphere, comprising a compressor arranged to deliver to the cabin the part of such withdrawn air which is to be returned thereto, a turbine arranged to drive such compressor and to be driven by the part of the withdrawn air which is to be discharged to the atmosphere, prior to such discharge, and a heat exchanger arranged to exchange heat between the part of the withdrawn air passing from the compressor to the cabin and the part of the withdrawn air passing from the exhaust of the turbine to the atmosphere.

For convenience herein the term "partially vitiated air" or "recirculated air" will hereinafter be used to identify the part of the air withdrawn from the cabin which is cooled and returned to the cabin while the term "more fully vitiated air" will be used to identify the part of such withdrawn air which is discharged continuously from the cabin to atmosphere and thus permits the continuous flow of fresh air into the cabin. It will be understood, however, that the extent of vitiation and/or contamination respectively of the air recirculated and the air discharged may vary widely and may be approximately the same or may differ in either sense depending on the part of a cabin or series of cabins from which it is withdrawn, but that when the extent and/or type of vitiation and/or contamination differs it will be preferable for the discharged air to be that which is liable to be the more fully vitiated and/or is liable to be contaminated in a manner which would render it undesirable for it to be returned to the cabin, e.g. by its being withdrawn from a galley, baggage compartment or lavatory accommodation.

Also for convenience herein, the terms "recirculating turbine" and "recirculating compressor" will be used to identify respectively the turbine and compressor through which the more fully vitiated air and the partially vitiated air respectively passes while the terms "fresh air turbine" and "fresh air compressor" will be used respectively to identify the turbine and compressor of the "boot-strap" type heat extraction apparatus through which fresh air flows on its way to the cabin.

It will be understood that as an aircraft to which the system according to the invention is applied climbs or descends, the cabin pressure is varied with altitude according to a predetermined plan in a manner known per se.

A cabin air conditioning system according to the invention may also include an additional rotor arranged to be acted upon by the recirculated air after such air has passed through the recirculating compressor and associated heat exchanger before such recirculated air is returned to the cabin, said turbine rotor being connected to the rotors of the recirculating compressor and the turbine in which the more fully vitiated air is expanded. Thus, in this arrangement the recirculating compressor, the heat exchanger referred to, and the said additional turbine rotor, constitute an augmented "boot-strap" unit permitting the extraction of more heat since the compression ratio of the recirculating compressor can be appropriately higher than would be the case where no such additional turbine rotor is provided. The increase in power required to drive the turbine is provided for in part by increasing the discharge flow from the cabin to the turbine employing more fully vitiated air and in part by increasing the expansion ratio of this turbine as compared with the case where it constitutes the sole means for driving the compressor of the recirculating unit.

According to a further feature of the invention the discharge of the more fully vitiated air after passing through the recirculating unit and the associated heat exchanger is controlled by a spill valve nozzle by which the rate of recirculation can thus also be controlled.

The arrangement may moreover be such that the spill valve nozzle in question is controlled automatically so as to maintain in the passage leading to it, a substantially predetermined constant pressure corresponding to atmospheric pressure at approximately some predetermined altitude and hence to maintain a substantially constant pressure drop across the recirculating turbine at all altitudes above the predetermined altitude. In this case the power output of the recirculating turbine and hence the rate of circulation of partially vitiated air by the circulating compressor tends to be maintained substantially constant for all atmospheric pressures above that corresponding to the predetermined altitude.

In addition manually and/or barometrically controlled devices may be provided to cause the spill valve nozzle to close automatically if there should be a serious fall in cabin pressure. Thus, in the event of such a serious fall the flow of more fully vitiated air through the recirculating unit is checked by the spill valve nozzle.

Where the aircraft includes two or more propulsion engines, two or more "sets" of air conditioning apparatus according to the invention may be provided each arranged to receive its fresh air from a different engine or different engines so as to provide two or more air condiitoning systems according to the invention each capable of operating independently of the other and not dependent on the same propulsion engine or engines for its fresh air supply. Moreover, in this case the control apparatus for the two "sets" of air conditioning apparatus (assuming there to be two only) may be provided with interconnections such that in the event of a failure or partial failure of one "set," the operation of the other "set" or a part thereof can be modified so as to compensate partially at least for the failure or partial failure.

Figure 2:
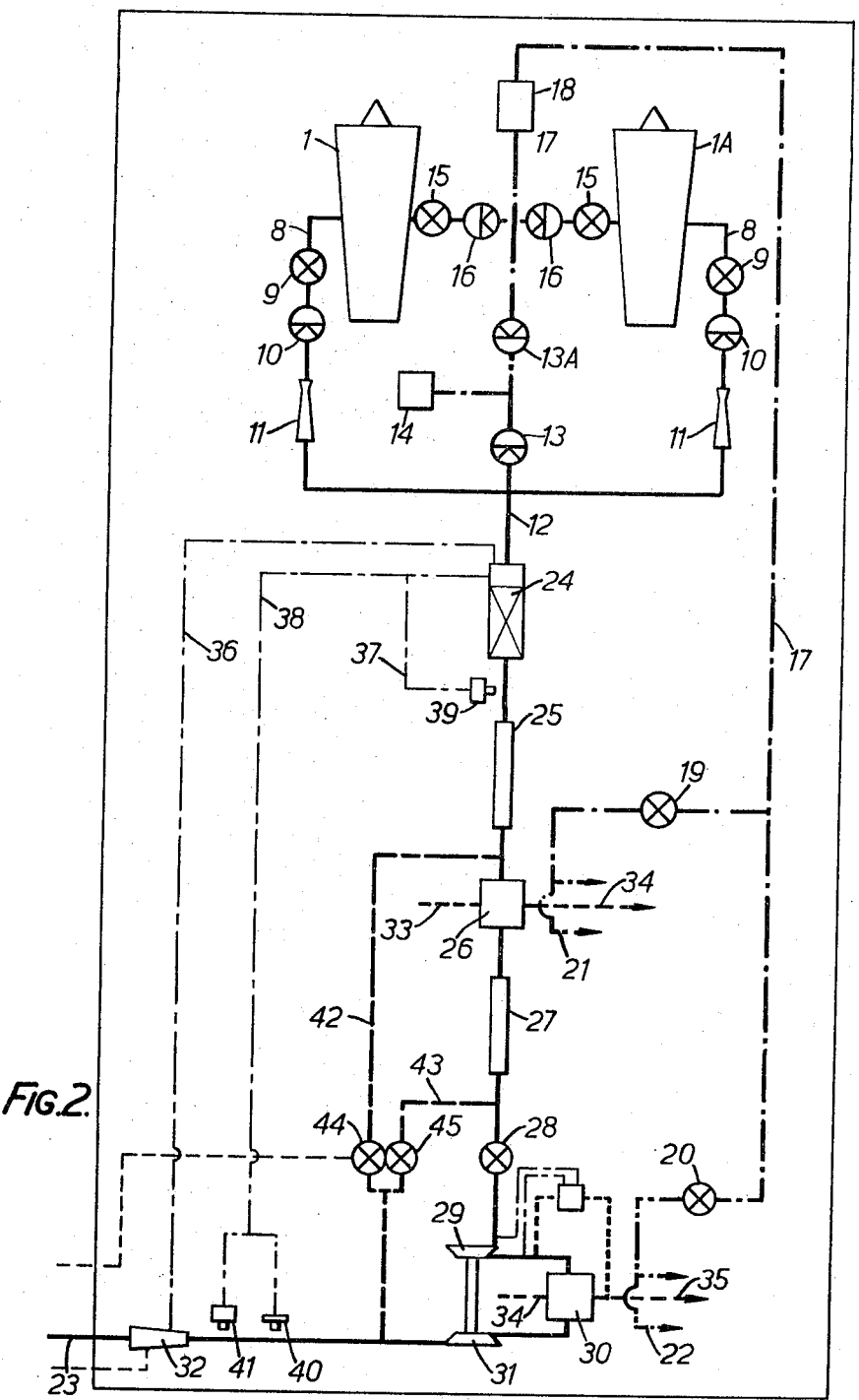
Figure 3:
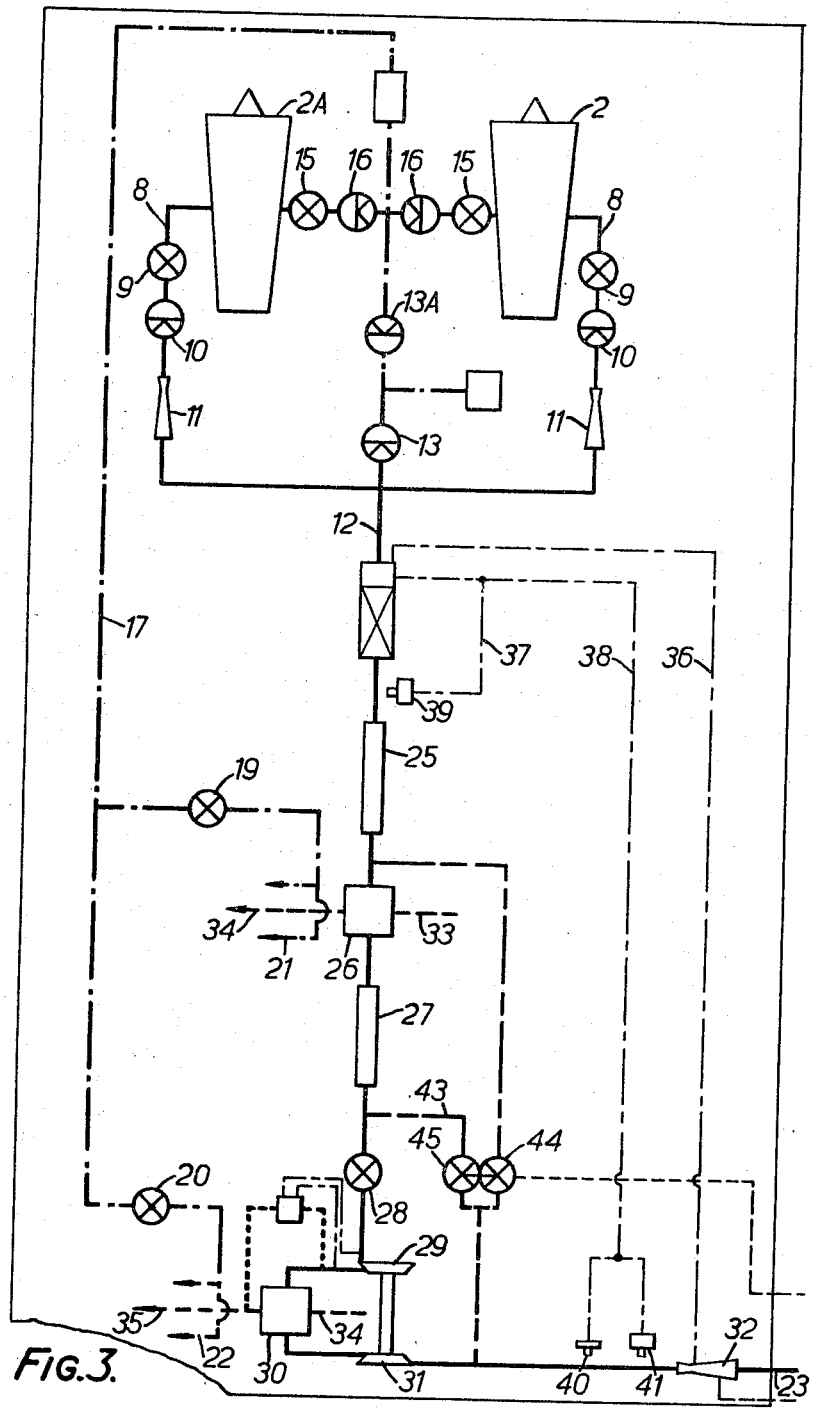

One specific example of a system according to the invention as applied to an aircraft having four propulsion engines, is shown diagrammatically by way of example in the accompanying drawings, in which:

FIGURE 1 is a diagram of the cabin accommodation of the aircraft and the parts of the system which are arranged therein or closely associated therewith and including two conditioned fresh air supply passages through which conditioned fresh air is supplied to such parts, FIGURES 2 and 3 show respectively the apparatus by which fresh air, derived in each case from a pair of engines is conditioned and delivered by the two conditioned fresh air supply passages referred to, and FIGURES 1, 2 and 3 may, therefore, be taken as constituting parts of a single diagram of which FIGURE 1 constitutes the central part, FIGURE 2 the right-hand part, and FIGURE 3 the left-hand part.

Figure 4:
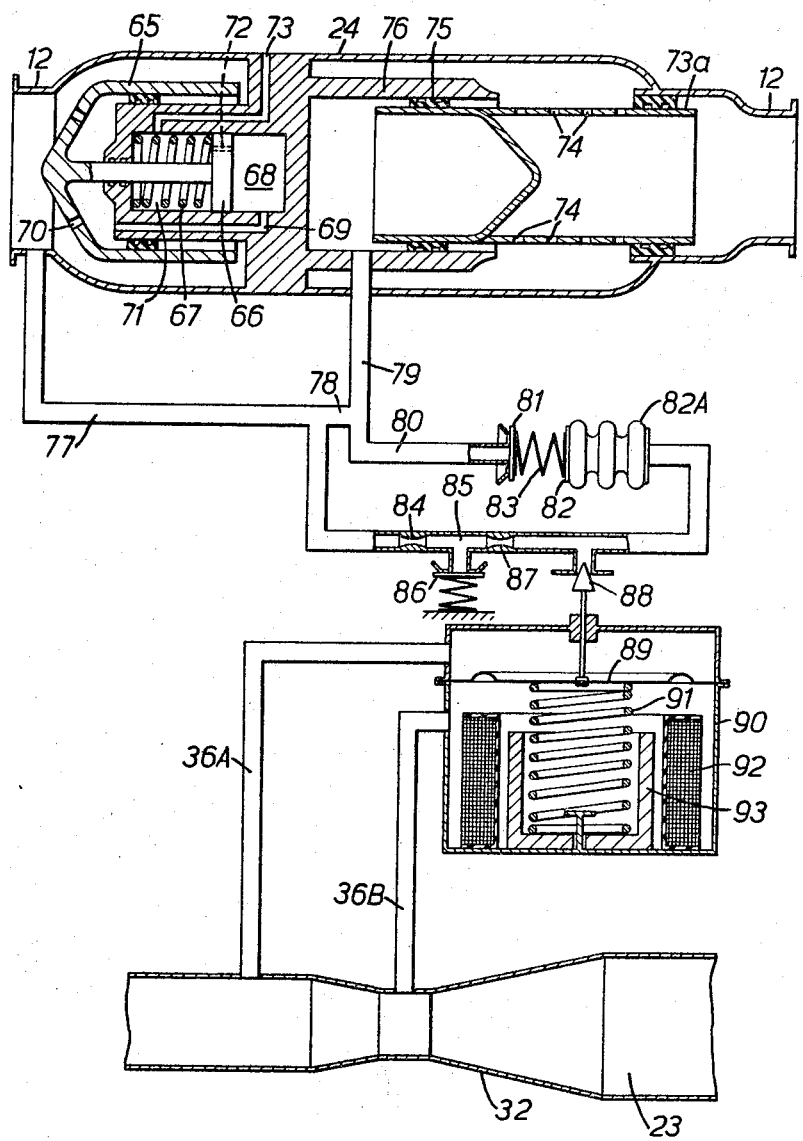
Figure 5:
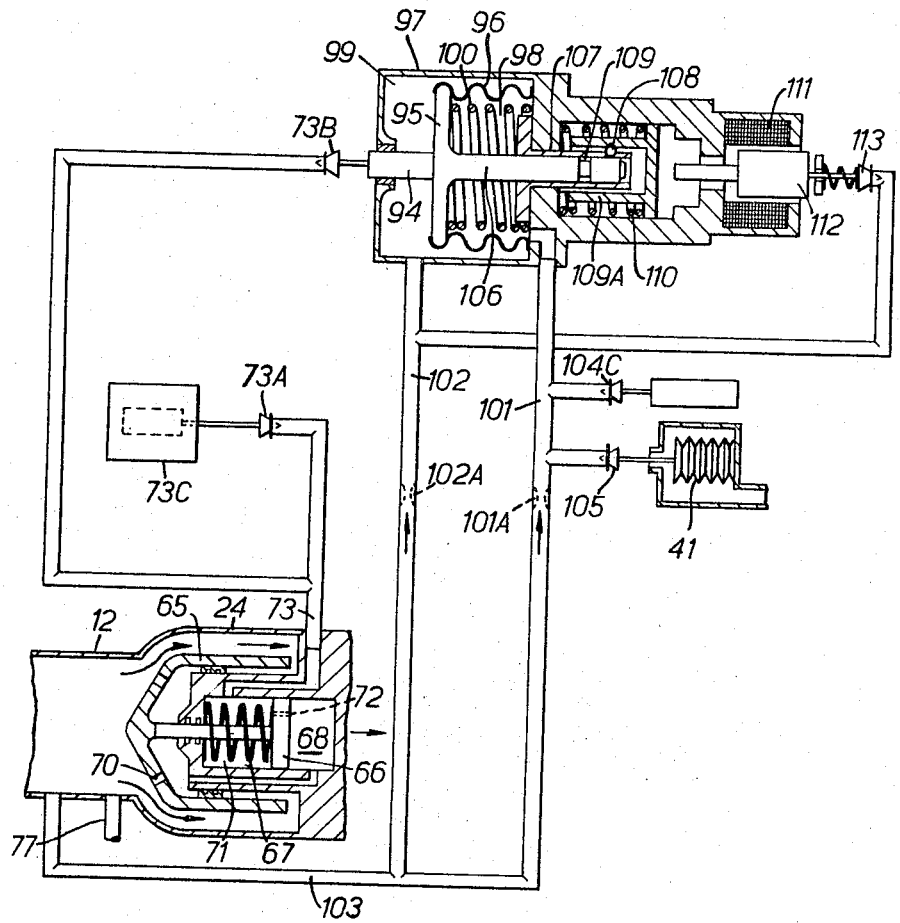

FIGURE 4 is a diagrammatic view of the control valves, and part of the associated control apparatus, for controlling the fresh air supply, and FIGURE 5 is a diagrammatic view of further control apparatus associated with the control valve of the apparatus shown in FIGURE 4 and including one of the control valves shown in that figure.

In the example of the invention shown in FIGURES 1, 2 and 3 of the drawings, the apparatus is intended for application to an aircraft capable of operating at supersonic speeds, this aircraft having two starboard engines 1 and 1A and two port engines 2, 2A assumed to be housed in appropriate nacelles. The fuselage of the aircraft is indicated generally by the reference numeral 3 and contains pressurised accommodation comprising a "flight deck" compartment, indicated generally at 3A, and a main passenger compartment indicated generally at 3B, and subsidiary accommodation indicated generally at 3C and comprising, for example, a galley compartment, a baggage compartment and lavatory accommodation. The compartments constituting the pressurised accommodation may be assumed to be in free communication with one another and to be connected to the external atmosphere by one or more discharge valves, in known manner, permitting escape of air from the pressurised accommodation to the atmosphere for the purpose of maintaining a suitable pressure (herein called the cabin pressure) in the accommodation as a whole. The relationship between the cabin pressure and the atmospheric pressure with changes in altitude of the aircraft may be assumed to be controlled, also in known manner, in accordance with an appropriate law so as to maintain adequate pressure in the accommodation at all times, although at the higher altitudes this pressure may be lower than ground level atmospheric pressure for the purpose of reducing the maximum difference between cabin pressure and external pressure which the pressurised accommodation has to withstand.

In the arrangement shown the apparatus is arranged to deliver to the cabin accommodation 3A, 3B continuously through each of two passages 5, 5A a mixture of fresh air and recirculated air, while there flows from the cabin accommodation as a whole continuously partially vitiated air and more fully vitiated air respectively through two outlet passages 6 and 7, of which the passage 7 leads from the main passenger compartment 3B while the passage 6 leads from the area 3C including the subsidiary compartments such as the galley, the baggage compartment and the lavatory accommodation.

As mentioned above, the complete system comprises two sets of air conditioning apparatus each arranged to receive its fresh air from one of the two pairs of propulsion engines 1, 1A and 2, 2A, and for convenience and brevity the following description of the circulating and flow systems for fresh air, partially vitiated air and more fully vitiated air, applies to each set, the same reference numerals being therefore used for the corresponding parts of each set although, as indicated in FIGURE 1, the parts of the two sets associated with the cabin accommodation are not disposed symmetrically in that accommodation.

The conditioned fresh air delivery system associated with each of the pairs of engines 1, 1A and 2, 2A comprises a pair of air delivery passages 8 leading respectively from the appropriate points in the air compressors of the engines 1, 1A or 2, 2A and each passing by way of a shutoff valve 9, a non-return valve 1 and a venturi 11 to a common air delivery passage 12. The common air delivery passage 12 is connected via a non-return valve 13 to a ground connection 14 by which fresh air can be supplied from an independent air supply to the common air delivery passage 12 when the aircraft is on the ground. The compressor of each of the engines is also connected by way of a shut-off valve 15 and a non-return valve 16 to a passage 17 by which air can be delivered via a pressure reducing valve 18 and shut-off valves 19 and 20 to two jet type pumps 21 and 22, i.e. pumps operating by the ejector action of fluid passing through one nozzle upon fluid passing through a second nozzle concentric with the first and the functions of which are hereinafter referred to. The ground connection 14 also communicates with the passage 17 through a non-return valve 13A.

Air conditioning apparatus is provided arranged to receive air from the common air delivery passage 12 and to deliver such air as conditioned fresh air through a conditioned fresh air passage 23 to the part of the system shown in FIGURE 1. The conditioning apparatus referred to, through which the air passes in sequence, comprises a combined shut-off and flow control valve assembly shown at 24, an ozone converter 25, a heat exchanger 26, a radio-active dust filter 27, an emergency shut-off valve 28, and a boot-strap type cooling system comprising a compressor rotor 29 by which the air is delivered via a heat exchanger 30 to a fresh air turbine rotor 31 connected to the compressor rotor 29, the cooled air from the turbine rotor 31 of the bootstrap system passing to the conditioned fresh air passage 23 by way of a mass flow measuring venturi device 32. The cooling fluid for the heat exchanger 26 is air derived from an appropriate forwardly facing ram air intake, for example a boundary layer air intake adjacent a wing of the aircraft, delivered through a passage 33 and exhausted to atmosphere through a passage 34 in which is arranged the jet pump 21. When the aircraft is not in flight, therefore, air derived from the passage 17 can be employed in the jet pump 21 to provide a flow of cooling air through the heat exchanger 26.

Similarly the cooling fluid for the heat exchanger 30 is derived from an appropriate forwardly facing ram air intake and is delivered through a passage 34 and exhausted to atmosphere through a passage 35 in which is arranged the jet pump 22, which can therefore, maintain a flow of cooling air through the heat exchanger 30 when the aircraft is not in flight.

The combined shut-off valve and flow control valve 24 includes a control valve arranged to be controlled automatically via a connection 36 by the mass flow measuring venturi 32, and a shut-off valve arranged to be automatically actuated through connections 37, 38 to shut off the supply of air, by a high pressure excess pressure device indicated at 39 which operates should a predetermined maximum pressure be exceeded in the passage 12, by an excess temperature device 40 and a further low pressure excess pressure device 41, respectively sensitive to the temperature and the pressure in the passage 23.

By-pass passages 42 and 43 controlled respectively by valves 44 and 45, are provided by which respectively air can be caused to by-pass the heat exchanger 26 and the bootstrap air cooling unit 29, 30, 31 or by-pass only the bootstrap air cooling unit 29, 30, 31 thus causing air to be delivered directly to the passage 23 either from a point in advance of the heat exchanger 26 or from a point between this heat exchanger and the bootstrap cooling unit 29, 30, 31. The valves 44, 45 are controlled by control apparatus responsive jointly to temperature-responsive devices indicated generally at 46, 47 and 48, in FIGURE 1 the functions of which are hereinafter referred to, the arrangement being such that, assuming both valves 44 and 45 to be fully closed and progressively reduced cooling of the air delivered through the passage 23 to be required, the valve 45 is progressively opened first and when this valve is almost fully open the valve 44 begins progressively to open, the valve 45 beginning to close again before valve 44 is fully open.

Each of the conditioned fresh air passages 23 communicates with the appropriate part of an associated recirculating apparatus, the two "sets" of recirculating apparatus, which are similar, being shown in FIGURE 1. The conditioned air supplied to each of these sets is delivered through a water separator 49, a non-return valve 50 and a shut-off valve 51 to a passage 52. There is an interconnection 53 between the two conditioned air passages at points between the valves 50 and 51 as shown containing a further shut-off valve 54 which thus enables conditioned air to be delivered to each of the recirculating sets from the conditioned air supply passage 23 normally associated with the other set should this be desirable.

Each set of the recirculating apparatus comprises an inlet passage 55 for more fully vitiated air leading from the passage 6 to the inlet of a turbine rotor 56 the outlet passage from which leads via a heat exchanger 57 to a discharge passage 58 including a controllable nozzle valve 59 through which the air is discharged to atmosphere. The turbine rotor 56 is connected to the rotor 60 of an air compressor arranged to draw air continuously from the passage 7 and deliver it via a passage 61 and the heat exchanger 57 to the inlet passage 62 of a second turbine rotor 63 which is a recirculating turbine rotor and also connected to the compressor 60, the outlet from the second turbine rotor 63 being arranged to deliver the recirculated air via a passage 64 into the passage 52 in which it mixes with the fresh air and flows with it to the appropriate outlet passage 5 or 5A. The passage 5, 5A therefore constitutes a mixed air passage through which the mixed fresh and recirculated air is delivered, in the case of one of the recirculating units to the cabin compartment 3A and in the case of the other to the cabin compartment 3B as shown. An interconnection 5B is provided between the passages 5 and 5A with a control valve 5C therein by which the proportions of the total mixed fresh and re-circulated air delivered respectively through the passages 5 and 5A can be adjusted.

It will be apparent that the combined turbine and compressor assembly 56, 60, 63 in conjunction with the heat exchanger 57 constitutes an augmented bootstrap system in which part of the power for driving the compressor rotor 60 is derived from the more fully vitiated air acting on the turbine rotor 56, while the compressor rotor 60 and turbine rotor 63 constitute the boot-strap system proper in which a proportion of the power required to drive the compressor rotor is derived from the turbine rotor.

As will be seen, the three temperature-sensitive devices 46, 47 and 48 are arranged to be responsive respectively to the temperature in the mixed air passage the temperature in the cabin compartment 3A or 3B, and the skin temperature of the aircraft. The control apparatus associated with these devices thus controls the valves 44 and 45 in accordance with the three temperatures in question, all with a view to maintaining the cabin temperature within acceptable limits. The skin temperature sensor 42 provides signals anticipating a change in cabin heating or cooling requirement.

The nozzle valves 59 have two positions only, namely fully open and closed, and the control interconnections, indicated at 59A, between the nozzle valves 59 and the venturi device 32 control an electric actuator on each nozzle valve so as to maintain the nozzle valve open when the mass flow through the associated passage 23 exceeds a predetermined value, and to close the nozzle valve if such mass flow falls below such predetermined value. Direct manual control of the electric actuator should also be provided for, while in addition a spring-actuated device operable manually or automatically in the event of an abnormal fall in cabin pressure, may be provided to close the nozzle valves in this event.

The arrangement is moreover such that if and when the valve 54 is opened and one or other of the valves 51 is closed, the interconnections 59A between the nozzle valves 59 and the venturi devices 32 are changed over so that when only one of the passages 23 is delivering conditioned air the automatic control of the appropriate nozzle valve 59 by the mass flow will be maintained.

As mentioned, FIGURES 4 and 5 show control valve and control apparatus. These figures show diagrammatically the arrangement of the combined shut-off and control valve assembly, indicated generally at 24 in FIGURES 2 and 3, and apparatus by which this assembly is controlled in the required manner. In FIGURES 4 and 5 the casing of the combined shut-off and control valve assembly is indicated for convenience by the reference numeral 24 used to identify this assembly in other figures, within which casing are a shut-off valve and a control valve arranged in series. The shut-off valve comprises a valve member 65 connected to an operating piston 66 which is acted upon by a spring 67 tending to open the valve and is subject in the opposite direction to the pressure in a chamber 68 which communicates through passages 69 and 70 with the upstream portion of the passage 12. The chamber 71 on the side of the piston 66 remote from the chamber 68 communicates with the chamber 68 through a restricted passage 72 in the piston, and also with a relief passage 73 which is capable of being opened by the opening of either of two valves 73A and 73B (see FIGURE 5). The valve 73B is arranged to be normally closed, but to be opened automatically in a manner more fully hereinafter described, if during operation of the apparatus any one of the three safety devices 39, 40 or 41 is actuated due to an excessive temperature or excessive pressure as the case may be.

The valve 73A on the other hand is held open by a solenoid 73C when the solenoid is energised and closes automatically if the solenoid is de-energised.

It will be apparent that when the valves 73A and 73B are both closed, the pressures on the two sides of the piston 66 are the same and the valve 65 is thus maintained open by the spring 67, whereas the opening of either of the valves 73A or 73B relieves the pressure in the chamber 71 owing to the relatively small cross-section of the passage 72, and the valve 65 is then closed by the pressure in the chamber 68 against the force of the spring 67. The solenoid 73C is deenergised during operation so that the valve 65 is held open but will close if the valve 73B opens or if the solenoid 73C is energised to stop operation of the fresh air supply apparatus.

The flow control valve, which, as mentioned, is controlled from the appropriate venturi device 32, comprises a sleeve valve 73a having ports 74 in its wall through which air can flow in the manner indicated by the arrows, this sleeve valve having a piston part 75 operating within a cylinder 76 the pressure in which is controlled by pneumatic apparatus.

The pneumatic apparatus comprises a pressure supply passage 77 leading from the upstream side of the shut-off valve 65, opening through passage 79 into the cylinder 76 and into a passage 80 containing a spring-pressed relief valve 81, the abutment 82 for the spring 83 of which is movable by a bellows type diaphragm 82A. The passage 78 also communicates through a metering orifice 84 with a chamber 85 provided with a maximum pressure relief valve 86 for maintaining a substantially constant pressure therein, the chamber 85 in turn communicating through a further metering orifice 87 with the interior of the bellows 82A by way of a passage containing a relief port controlled by a valve 88 actuated by a diaphragm 89. It will be seen, therefore, that the setting of the valve 88 controls the pressure in the bellows 82A and hence the compression of the spring 83 which determines the pressure maintained in the passages 79 and 80 and hence in the cylinder 76.

The diaphragm 89 extends across a housing 90 which it thus divides into two chambers which are connected respectively through interconnections 36A and 36B to the upstream side and to the throat of the appropriate venturi device 32, these connections 36A and 36B in FIGURE 4 thus being represented by the connection indicated at 36 in FIGURES 2 and 3. The diaphragm 89 is acted upon by a biasing spring 91, the setting of which thus determines the pressure normally maintained in the bellows 82A and hence the datum pressure maintained in the cylinder 76, and also has associated with it a solenoid 92 which, when energised, causes a movable abutment 93 for the biasing spring 91 to compress the spring 91 to a predetermined additional degree and thus change the datum pressure maintained in the cylinder 76.

Alternatively the movable abutment could be normally urged by a control spring towards the position in which the spring 91 is more highly compressed and normally held in its other position by the solenoid so that failure of the solenoid would produce the higher datum pressure to be established.

The valve 73B is connected by a rod 94 to an operating member 95 constituting one end of a bellows type diaphragm 96 extending across a casing 97 so as to be acted upon in opposite directions respectively by the pressures in two pressure chambers 98, 99, the member 95 being also acted upon by a biasing spring 100.

The chambers 98 and 99 communicate through passages 101 and 102 and metering orifices 101A, 102A with a passage 103 opening out of the passage 12 on the upstream side of the shut-off valve 65, so that normally the chambers 98 and 99 are maintained at the same pressure and the valve 73B is maintained closed by the spring 100. Pressure in the passage 101 can be relieved by the opening of either one of two valves 104 and 105, of which 104 is arranged to be opened by a device 40A on receipt of a signal from the excess temperature device 40 or the excess temperature device 39 if an excess temperature occurs in the passage 23 or the passage 12 as the case may be, while the valve 105 is arranged to be opened by a pressure sensitive bellows subject to the pressure in the passage 23 and constituting the device 41 indicated diagrammatically in FIGURE 2 or FIGURE 3. The control line 38 in FIGURES 2 and 3 therefore represents the path through which the valves 104 and 105 are controlled by the devices 40, 41 and 39.

It will be apparent that the member 95 will open the valve 73B if, during operation of the system, either of the valves 104 or 105 is opened by its respective control device 40A or 41. The member 95 has a stem 106 sliding in a guide 107 provided with apertures in which are located latching balls 108 which can cooperate with a notch 109 in the stem to hold the valve 73B open when it has been opened. When the balls 108 enter the notch 109 they simultaneously release a sleeve 109A surrounding the guide 107 and acted upon by a spring 110, so that the sleeve 109A moves to the right in FIGURE 5 and thus in turn locks the balls 108 in the notch 109.

For resetting the member 95 and valve 73B there is provided a solenoid 111 having an armature 112 which, when the solenoid is energised, acts on the sleeve 109A to move it back into its original position and simultaneously opens a valve 113 relieving pressure in the chamber 99. This enables the spring 100 to apply sufficient force to the stem 106 to eject the balls 108 from the notch 109 back into the position shown in which they bear on the circumference of the stem 106.

A manually operated device arranged to act on the sleeve 109 to effect such resetting could also be provided.

The solenoid 92 may be arranged to be energised manually and/or automatically, if a condition should arise making it desirable for the higher datum pressure to be established and maintained in the cylinder 76 so as to establish and maintain the higher rate of flow through the passage 12. For example, the solenoid 92 associated with the apparatus shown either in FIGURE 2 or that shown in FIGURE 3 might be arranged to be automatically energised if and when the rate of flow of fresh air in the fresh air system shown in the other of those figures falls below a predetermined value.

What I claim is my invention and desire to secure by Letters Patent is:

1. A cabin air conditioning system including means for delivery of conditioned fresh air from an air compressor to at least one cabin by way of heat extraction apparatus, means for withdrawing air from the cabin and returning part of the air so withdrawn to the cabin and exhausting the remaining part of such air to the atmosphere comprising a compressor arranged to deliver to the cabin the part of such withdrawn air which is to be returned thereto, a turbine arranged to drive such compressor and to be driven by the part of the withdrawn air which is to be discharged to the atmosphere, prior to such discharge, and a heat exchanger arranged to exchange heat between the part of the withdrawn air passing from the compressor to the cabin and the part of the withdrawn air passing from the exhaust of the turbine to the atmosphere.

2. A cabin air conditioning system as claimed in claim 1 including, in addition to the turbine arranged to be driven by the air to be exhausted to the atmosphere, a further turbine the rotor of which is connected to the compressor rotor and is arranged to be acted upon by the air to be returned to the cabin after such air has passed through the heat exchanger.

3. A cabin air conditioning system as claimed in claim 1 including control valve apparatus arranged to control the flow of air from the turbine into the atmosphere and hence to control the pressure maintained in the exhaust passage of the turbine, and means responsive to the rate of delivery of conditioned fresh air arranged to close said valve apparatus automatically if and when such rate of flow drops below a pre-determined value.

4. A cabin air conditioning system as claimed in claim 3 in which manual control means are provided whereby said valve apparatus can be closed at will.

5. A cabin air conditioning system as claimed in claim 3 in which means responsive to cabin air pressure are provided and arranged automatically to close said valve apparatus should cabin air pressure drop below a predetermined value.

6. A cabin air conditioning system as claimed in claim 1 in which the heat extraction apparatus in the fresh air supply system includes a compressor arranged to deliver fresh air by way of a heat exchanger to a turbine which drives the said compressor and from the outlet of which fresh air is delivered to the cabin, and wherein a by-pass passage is provided by which fresh air can flow direct from the inlet side of said compressor to the outlet side of said turbine, and by-pass valve apparatus is arranged to control the flow of air through said by-pass passage, and temperature-sensitive control means are provided for controlling said by-pass valve apparatus.

7. A cabin-air conditioning system as claimed in claim 6 in which the heat extraction apparatus for the conditioned fresh air includes a heat exchanger disposed in advance of the turbine and compressor constituting part of the heat extraction apparatus, and in which the by-pass valve apparatus includes a valve arranged to control the flow of air from a point in advance of said heat exchanger to the outlet side of said turbine and a valve controlling the flow of air from a point between the heat exchanger and said compressor to the outlet side of said turbine while the temperature-sensitive control means controls both said valves.

8. A cabin air conditioning system as claimed in claim 6, in which the said heat exchanger has associated with it a jet type pump and the system includes controllable means for delivering operating air to said jet type pump or pumps from the air compressor constituting the source of fresh air.

9. Two cabin air conditioning systems each as claimed in claim 1 and each including a fresh air flow control valve, control apparatus responsive to the mass air flow in the fresh conditioned air delivery passage to control said fresh air flow control valve in a manner tending to maintain such mass air flow constant, adjusting means whereby said control apparatus can be set at a predetermined higher datum or at a predetermined lower datum corresponding respectively to the maintenance of predetermined higher and lower rates of mass air flow, said two systems being arranged in parallel, means in each system responsive to the rate of mass flow of conditioned fresh air in said system, and means for automatically setting the control apparatus of the fresh air control valve of each system at the predetermined higher datum if the rate of mass air flow in the other system drops below a predetermined value.

10. A cabin air conditioning system as claimed in claim 9, in which manual means are provided for rendering either of the two systems inoperative and the operation of such means to render either system inoperative automatically sets the control apparatus of the fresh air control valve of the other system at the predetermined higher datum.

11. An aircraft comprising:
 (a) a pressure cabin;
 (b) a fresh air supply system outside the cabin including a fresh air compressor having an outlet, a heat exchange cooler having an inlet connected to the compressor outlet and an outlet, a fresh air turbine having an inlet connected to the cooler outlet and an outlet, and means coupling the air turbine to drive the compressor;
 (c) air recirculating means in the cabin including an air recirculating compressor having an air inlet from the cabin and an outlet, a heat exchange cooler having an inlet connected to the compressor outlet and an outlet, an air recirculating turbine having an inlet connected to the cooler outlet and an outlet, an additional power source, and means coupling the air turbine and the additional power source to drive the compressor,
 (d) air mixing and distributing means in the cabin; and
 (e) passage means connecting the outlet of the fresh air turbine and the outlet of the recirculating air turbine to the air mixing means.

12. An aircraft according to claim 11, in which the additional power source of the air recirculating means is an air turbine having an air inlet from the cabin and an outlet connected to the recirculating air heat exchange cooler to supply coolant thereto.

13. A method of pressurising and ventilating the cabin of an aircraft flying at supersonic speeds by means of hot high pressure fresh air bled from a propulsion engine compressor, comprising:
 (a) subjecting the hot high pressure fresh air to a compression-expansion cycle with intercooling to reduce its pressure substantially to the required cabin pressure and to reduce its temperature to a value sufficiently above freezing point to avoid icing;
 (b) subjecting air from the cabin to a compression-expansion cycle with intercooling to reduce its temperature to below the required cabin temperature;
 (c) mixing the cooled fresh air with the cooled air from the cabin and admitting to the cabin;
 (d) adjusting the relative temperature of the cooled fresh air and the cooled cabin air so as to maintain the required cabin temperature.

14. A method according to claim 13 in which the intercooling of the air from the cabin is effected by heat exchange with air exhausted from the cabin to the atmosphere from which energy has been extracted for performance of the compression-expansion cycle.

References Cited

UNITED STATES PATENTS

| | | | |
|---|---|---|---|
| 2,409,159 | 10/1946 | Singleton | 62—402 X |
| 2,485,522 | 10/1949 | Andersen | 62—402 X |
| 2,734,443 | 2/1956 | Wood | 98—1.5 |
| 2,767,561 | 10/1956 | Seeger | 62—402 X |
| 3,097,504 | 7/1963 | Quick | 62—402 X |

MEYER PERLIN, *Primary Examiner.*